Aug. 5, 1924.
F. L. TAYLOR
TIRE GRIP
Filed April 21, 1923
1,503,725
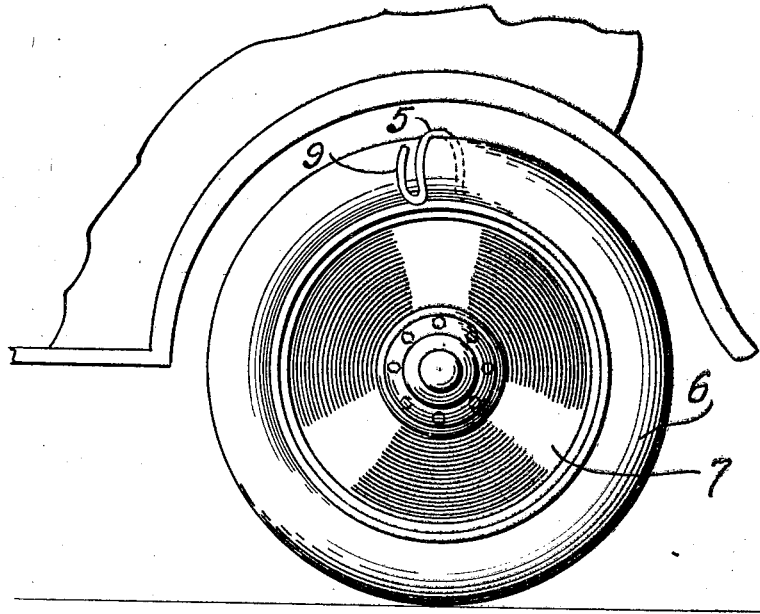
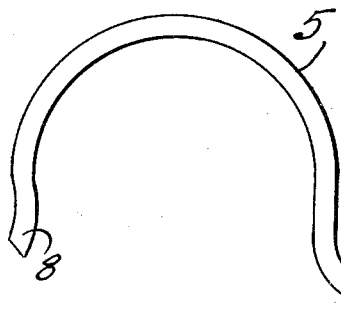
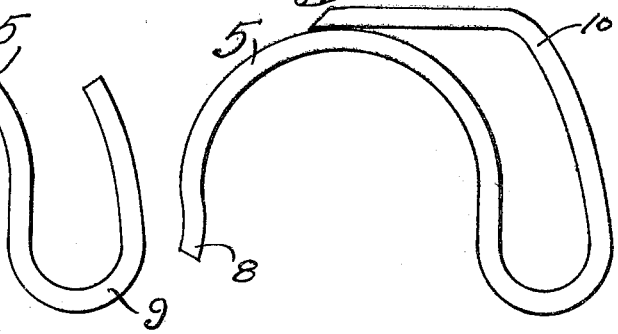
INVENTOR.
F. L. TAYLOR
BY
ATTORNEYS.

Patented Aug. 5, 1924.

1,503,725

UNITED STATES PATENT OFFICE.

FREDERICK L. TAYLOR, OF SPOKANE, WASHINGTON.

TIRE GRIP.

Application filed April 21, 1923. Serial No. 633,755.

*To all whom it may concern:*

Be it known that I, FREDERICK L. TAYLOR, a citizen of the United States, and a resident of Spokane, county of Spokane, State of Washington, have invented a new and useful Tire Grip, of which the following is a specification.

My invention relates in general to gripping devices and has reference more particularly to a tire grip for use in facilitating the moving of automobiles or the like wheel vehicles when it is desired to push them around, so to speak.

In many instances, for instance, in garages and other places, it is disirable to move an automobile without the help of the engine and this of course is rather a laborious task, especially in the case of heavy vehicles, due to the fact that there is nothing that offers an adequate hand grip on the vehicle at the place where effective leverage is needed to perform the so-called pushing movement.

The primary object of my invention is to provide a device which may be conveniently applied to the wheel of the vehicle, preferably one of the rear wheels, so as to offer a hand grip of sufficient leverage to enable attraction to be imparted to the wheel and through it to the vehicle without undue effort.

A further object of the invention is to provide a grip of the class described which is unusually simple in construction, easily applied and capable of being produced at a very nominal cost.

The invention possesses further objects and features which will appear as the description now proceeds with reference to the accompanying drawing in which Figure 1 is a view in side elevation of the left hand rear wheel of an automobile, also showing a portion of the body of the automobile; Figure 2 is a view in side elevation of one form of the grip, and Figure 3 is a similar view of another form of the grip.

Referring now to the drawing in detail, I propose to produce the device preferably from a single rod like member (5) with the same formed to approximately conform to the transverse continuity of the tire (6) of the automobile wheel (7) so that the device may engage the circumference of the rear wheel radially of the axis thereof as best shown in Figure 1. Instead of cutting off one end of the device to correspond with the end (8), I suggest continuing the same and looping it upon the curved part (5) to leave a hand grip (9) which will project radially from the tire so that it may be grasped by the hand. As a modified form the continuation of the device, instead of terminating in a relatively short length as in Figure 2, it may be made longer and bent completely upon the curved part (5) and welded or brazed thereto so as to leave a completely looped hand grip (10). The function of the device in both forms is the same and either form will perform its intended use to advantage.

It is of course realized that the curved part (5) of the device is simply slipped over the tire and when a pull or thrust is imparted to the hand grip part, the twisting effect of the curved part (5) on the tire will prevent the device from slipping circumferentially of the tire, consequently providing a fixed gripping device as required.

The curved part (5) of the device in all cases should form not less than a semi-circle and it should engage at least half the circumference of the tire.

Since the device does not depend on any particular wheel construction to enable it to function, it will work equally as well on a disc wheel as on a spoke wheel. In fact it can be said that it is of greater importance to a disc wheel automobile than a spoke type automobile, since the spokes can sometimes be used as a hand grip, while on the disc wheel type there is nothing on a wheel to offer a hand grip.

I claim:

1. A grip for a tired wheel comprising a hand lever with a U shaped socket formed thereon adapted to be placed transversely over the tire of the wheel and to tightly engage opposite sides thereof upon moving the lever in direction of wheel rotation.

2. A grip for a rubber tired vehicle wheel comprising a U shaped device adapted to be placed transversely over the tire to engage opposite sides thereof and having a handle extending from one of the legs of the U lying adjacent the side of the tire when the device is in position on the tire.

3. A grip for an automobile tire comprising a device having an open socket adapted to be placed transversely over the tire and engage opposite sides thereof, and a handle rigidly connected to the device lying adjacent the tire.

4. A grip for an automobile tire comprising a rod bent to form an open hook adapted to be placed over the tire to engage opposite sides thereof, and with one end of the rod extended and bent in a reverse direction to form a handle.

5. A grip for an automobile tire comprising a rod bent to form an open hood adapted to be placed over the tire to engage opposite sides thereof, and with one end of the rod extended and bent in a reverse direction to form a handle, the extreme end of the rod being returned to the back of the open hook and being secured thereto.

FREDERICK L. TAYLOR.